United States Patent
McBeath et al.

(10) Patent No.: US 8,614,985 B2
(45) Date of Patent: Dec. 24, 2013

(54) METHOD AND APPARATUS FOR SHARING A GROUP RESOURCE IN A WIRELESS SDMA SYSTEM

(75) Inventors: Sean Michael McBeath, Keller, TX (US); Anthony C. K. Soong, Plano, TX (US)

(73) Assignee: FutureWei Technologies, Inc., Plano, TX (US)

(*) Notice: Subject to any disclaimer, the term of this patent is extended or adjusted under 35 U.S.C. 154(b) by 836 days.

(21) Appl. No.: 12/135,916

(22) Filed: Jun. 9, 2008

(65) Prior Publication Data

US 2008/0310363 A1    Dec. 18, 2008

Related U.S. Application Data

(60) Provisional application No. 60/944,477, filed on Jun. 15, 2007.

(51) Int. Cl.
*H04W 4/00* (2009.01)

(52) U.S. Cl.
USPC .......................... 370/330; 370/328; 370/329

(58) Field of Classification Search
USPC .................................. 370/330–331
See application file for complete search history.

(56) References Cited

U.S. PATENT DOCUMENTS

| | | | |
|---|---|---|---|
| 6,351,459 B1 | 2/2002 | Kondo | |
| 6,377,572 B1 | 4/2002 | Dolan et al. | |
| 6,404,325 B1 | 6/2002 | Heinrich et al. | |
| 6,597,919 B1 | 7/2003 | Kumar et al. | |
| 6,907,246 B2 | 6/2005 | Xu et al. | |
| 7,116,240 B2 | 10/2006 | Hyde | |
| 7,130,638 B2 | 10/2006 | Chen et al. | |
| 7,215,251 B2 | 5/2007 | Hyde | |
| 7,539,497 B2 | 5/2009 | Beale | |
| 7,706,323 B2 * | 4/2010 | Stopler et al. | 370/328 |
| 8,172,082 B2 | 5/2012 | Edwards et al. | |
| 2003/0221012 A1 | 11/2003 | Herrmann et al. | |
| 2004/0145454 A1 | 7/2004 | Powell et al. | |
| 2005/0201269 A1 | 9/2005 | Shim et al. | |

(Continued)

FOREIGN PATENT DOCUMENTS

| | | |
|---|---|---|
| CN | 11115899 | 10/1997 |
| CN | 1219306 A | 6/1999 |

(Continued)

OTHER PUBLICATIONS

"Medium Access Control Layer for Ultra Mobile Broadband (UMB) Air Interface Specification," 3rd Generation Partnership Project 2, 3GPP2 C.S0084-002-0, Version 2.0, Aug. 2007, 157 pages, 3GPP2.

(Continued)

*Primary Examiner* — Afshawn Towfighi
(74) *Attorney, Agent, or Firm* — Slater & Matsil, L.L.P.

(57) ABSTRACT

A method and apparatus of signaling radio resource allocation in a wireless communication system includes establishing groups of mobile stations which monitor a shared group scheduling bitmap; transmitting a group scheduling bitmap to the mobile stations, wherein the group scheduling bitmap contains a mobile station presence bitmap and an SDMA bitmap, wherein the SDMA bitmap is used to divide the group members into two or more subgroups; and transmitting packets to the mobile stations or receiving packets from the mobile stations using the radio resource which is derived from the value indicated in the group scheduling bitmap.

23 Claims, 14 Drawing Sheets

(56) References Cited

U.S. PATENT DOCUMENTS

| | | |
|---|---|---|
| 2005/0281228 A1 | 12/2005 | Oh et al. |
| 2006/0039274 A1 | 2/2006 | Park et al. |
| 2006/0109865 A1 | 5/2006 | Park et al. |
| 2006/0133312 A1 | 6/2006 | Harrison Teague et al. |
| 2006/0209754 A1 | 9/2006 | Ji et al. |
| 2006/0293076 A1 | 12/2006 | Julian et al. |
| 2007/0058523 A1 | 3/2007 | Cho et al. |
| 2007/0060178 A1 | 3/2007 | Gorokhov et al. |
| 2007/0076670 A1 | 4/2007 | Kuchibhotla et al. |
| 2007/0097910 A1 | 5/2007 | Ji et al. |
| 2007/0206561 A1 | 9/2007 | Son et al. |
| 2007/0217370 A1 | 9/2007 | Soong et al. |
| 2007/0230412 A1 | 10/2007 | McBeath et al. |
| 2007/0274288 A1 | 11/2007 | Smith et al. |
| 2007/0275728 A1 | 11/2007 | Lohr et al. |
| 2007/0286066 A1 | 12/2007 | Zhang et al. |
| 2007/0291708 A1 | 12/2007 | Rao |
| 2008/0004029 A1 | 1/2008 | Moilanen |
| 2008/0025247 A1 | 1/2008 | McBeath et al. |
| 2008/0025337 A1 | 1/2008 | Smith et al. |
| 2008/0034274 A1 | 2/2008 | Song et al. |
| 2008/0037496 A1 | 2/2008 | Smith et al. |
| 2008/0043615 A1 | 2/2008 | Li et al. |
| 2008/0062936 A1 | 3/2008 | He et al. |
| 2008/0062944 A1 | 3/2008 | Smith et al. |
| 2008/0080422 A1 | 4/2008 | Frederiksen et al. |
| 2008/0080423 A1 | 4/2008 | Kolding et al. |
| 2008/0084843 A1 | 4/2008 | Gorokhov et al. |
| 2008/0146241 A1 | 6/2008 | Das et al. |
| 2008/0192847 A1 | 8/2008 | Classon et al. |
| 2008/0240034 A1 | 10/2008 | Gollamudi |
| 2008/0268785 A1 | 10/2008 | McCoy et al. |
| 2009/0022098 A1* | 1/2009 | Novak et al. .................. 370/329 |
| 2009/0029710 A1 | 1/2009 | Ochiai et al. |
| 2009/0047912 A1 | 2/2009 | Lee et al. |
| 2009/0070650 A1 | 3/2009 | Bourlas et al. |
| 2009/0075667 A1 | 3/2009 | Bourlas |

FOREIGN PATENT DOCUMENTS

| | | |
|---|---|---|
| CN | 1360446 A | 7/2002 |
| CN | 1536794 A | 10/2004 |
| CN | 1728695 A | 2/2006 |
| CN | 1780188 A | 5/2006 |
| CN | 1968452 A | 5/2007 |
| CN | 1968453 A | 5/2007 |
| CN | 101031130 | 9/2007 |
| CN | 101102142 A | 1/2008 |
| CN | 101868996 A | 10/2010 |
| EP | 1 786 220 A1 | 5/2007 |
| WO | WO 98/37706 | 8/1998 |
| WO | WO 2006/001658 A1 | 1/2006 |
| WO | WO 2006/096887 A1 | 9/2006 |
| WO | WO 2006/099577 A1 | 9/2006 |
| WO | WO 2006/113873 A2 | 10/2006 |
| WO | WO 2006/137708 A1 | 12/2006 |
| WO | WO 2007/033997 A1 | 3/2007 |
| WO | WO 2009/067955 A1 | 6/2009 |

OTHER PUBLICATIONS

McBeath, S., et al., "Efficient Signaling for VoIP in OFDMA," 2007 Wireless Communications and Networking Conference, Mar. 11-15, 2007, 6 pages, IEEE.

McBeath, S., et al., "Efficient Bitmap Signaling fo VoIP in OFDMA," 2007 Vehicular Technology Conference, Sep. 30, 2007-Oct. 3, 2007, 5 pages, IEEE.

Bourlas, Y., et al., "Persistent Allocation Updated Procedures," IEEE 802.16 Broadband Wireless Access Working Group, IEEE P802.16Rev2/D4, Apr. 19, 2008, pp. 1-50, IEEE.

"Technical Specification Group Radio Access Network; Physical Layer Aspects for Evolved UTRA (Release 7)," $3^{rd}$ Generation Project, 3GPP TR 25.814, V1.3.1, May 2006, pp. 6-11.

Third Chinese Office Action, Chinese Application No. 200880001172.3, Jun. 15, 2011, 9 pages.

Classon et al., U.S. Appl. No. 60/888,833, the specification and drawings, filed Feb. 8, 2007. 26 pages.

Written Opinion of the International Searching Authority, App. No. PCT/CN2008/071325, Date of mailing: Sep. 18, 2008, 5 pages.

Written Opinion of the International Searching Authority, App. No. PCT/CN2008/071317, Date of mailing: Sep. 18, 2008, 4 pages.

First Chinese Office Action, Chinese Application No. 200880001172.3, Dated: Jul. 1, 2010, 6 pages.

Second Chinese Office Action, Chinese Application No. 200880001172.3, Dated: Feb. 28, 2011, 9 pages.

"Text Proposal for Downlink OFDMA Resource Allocation and Mapping Rules for Distributed Mode Users in E-UTRA, with Discussion on Control Information," 3GPP TSG RAN WG1 #45, R1-061149, May 8-12, 2006, pp. 1-8.

International Search Report and Written Opinion, PCT/CN2008/071316, dated Sep. 25, 2008, 13 pages.

McBeath, S., et al, "Efficient Signaling for VoIP in OFDMA," Wireless Communications and Networking Conference IEEE Proceedings, Mar. 11-14, 2007, pp. 2249-2254.

International Search Report and Written Opinion received in PCT Application No. PCT/CN2008/071316, mailed Sep. 25, 2008, 13 pages.

First Chinese Office Action and Translation received in Chinese Patent Application No. 200880100578.7, mailed Mar. 16, 2012, 22 pages.

Third Chinese Office Action with Partial English translation received in Chinese Application No. 200880100578.7 mailed May 3, 2013, 17 pages.

Written Opinion of the International Searching Authority, received in PCT Application No. PCT/CN2008/073221, mailed Mar. 5, 2009, 3 pages.

International Search Report of the International Searching Authority received in PCT Application No. PCT/CN2008/073221, mailed Mar. 5, 2009, 2 pages.

Second Office Action with partial English translation received in Chinese Application No. 200880100578.7, mailed Dec. 5, 2012, 29 pages.

First Chinese Office Action and Partial Translation received in Chinese Application No. 200880001601.7, mailed Apr. 25, 2012, 11 pages.

"Part 16: Air Interface for Fixed Broadband Wireless Access Systems," Air Interface for Fixed Broadband Wireless Access Systems, IEEE P802,16-REVd.D5, May 2004, pp. 7-12.

\* cited by examiner

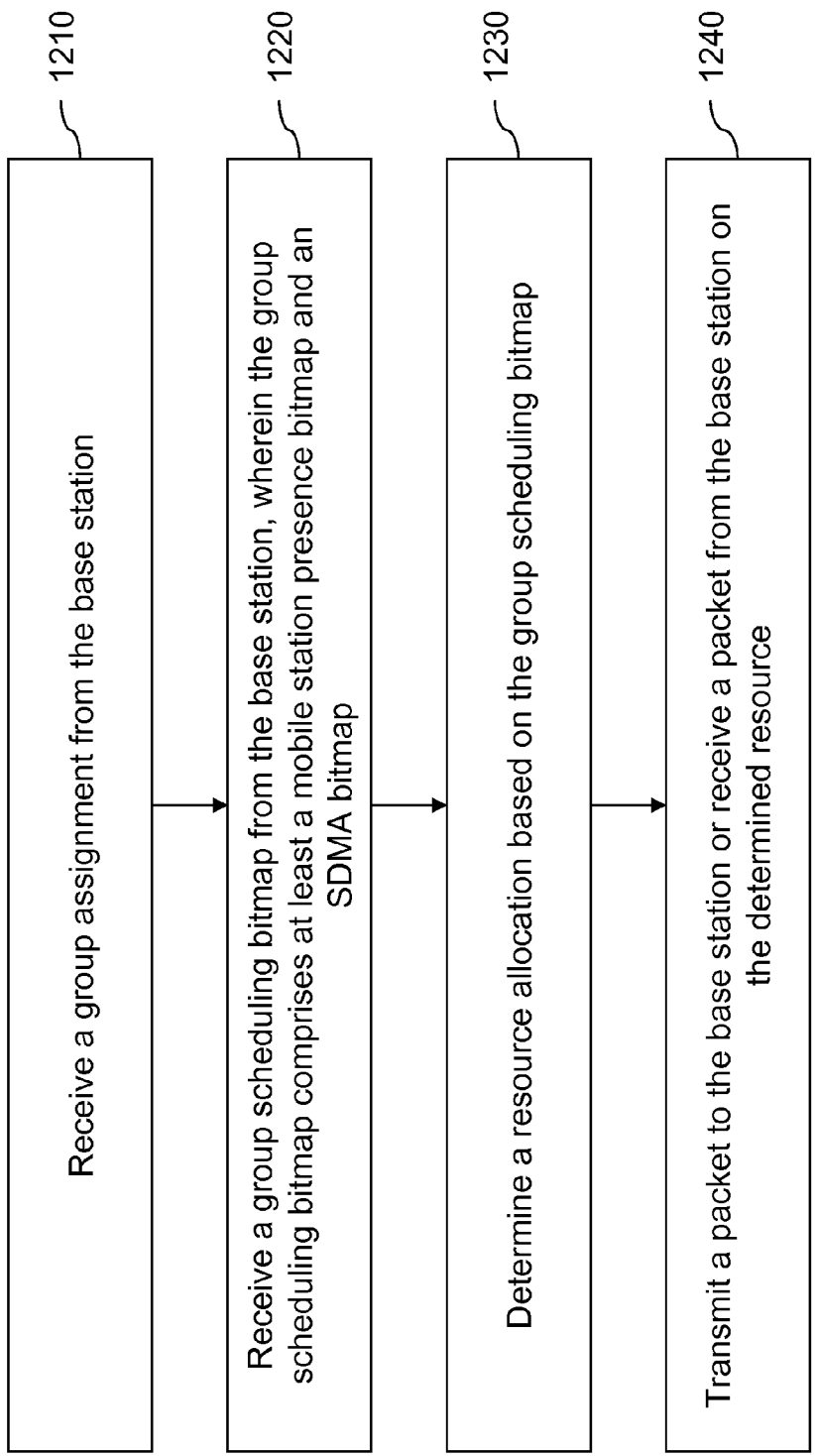

METHOD AND APPARATUS FOR SHARING A GROUP RESOURCE IN A WIRELESS SDMA SYSTEM

This application claims priority to U.S. Provisional Patent Application No. 60/944,477 filed Jun. 15, 2007, entitled "Method and Apparatus For Sharing a Group Resource In A Wireless SDMA System" which application is hereby incorporated herein by reference.

CROSS-REFERENCE TO RELATED APPLICATIONS

This application is related to the following provisional U.S. patent applications, each of which is incorporated herein by reference: U.S. Provisional Patent Application No. 60/944,462 filed Jun. 15, 2007; U.S. Provisional Patent Application No. 60/944,466 filed Jun. 15, 2007; and U.S. Provisional Patent Application No. 60/944,469 filed Jun. 15, 2007. Further, this application is related to the following non-provisional patent applications, each of which is incorporated herein by reference: U.S. patent application Ser. No. 12/134,025, filed Jun. 5, 2008; U.S. patent application Ser. No. 12/135,930, filed Jun. 9, 2008; and U.S. patent application Ser. No. 12/135,599, filed Jun. 9, 2008.

FIELD OF THE INVENTION

The present invention generally relates to allocation of radio resources for transmission in a wireless communication system. Specifically, the present invention relates to a novel method of signaling the allocation of radio resources for transmission in orthogonal frequency division multiplexing (OFDM) and orthogonal frequency division multiple access (OFDMA) communication systems, and resulting systems.

BACKGROUND OF THE INVENTION

In wireless communication systems, for a given bandwidth, it is desirable to maximize capacity. To maximize capacity, it is known to use multiple antenna techniques such as spatial division multiple access (SDMA), wherein two or more spatially separated mobile stations share the same radio resource. The base station allocates the same radio resource to the mobile stations and employs different effective antenna patterns to transmit the data for each of the mobile stations. Such techniques increase the spectral efficiency of the wireless communication system.

The allocation of radio resources to the mobile stations has a corresponding control channel overhead. If this overhead is not carefully managed, the overhead becomes prohibitively large and limits the capacity of the wireless communication system. This is particularly true for applications, such as voice over internet protocol (VoIP), that require the periodic delivery of small packets.

It is known to use group scheduling to minimize the control channel overhead associated with the delivery of VoIP packets. In group scheduling, a group of mobile stations monitor a shared control channel to determine their respective allocation from a set of shared radio resources, wherein the shared control channel typically contains a bitmap comprising at least one bit for each mobile station. The mobile stations monitor their respective bit of the bitmap to determine if one of the shared radio resources have been allocated by the base station, and determine which of the shared radio resources have been allocated based on the number of mobile stations, with smaller bit positions in the bitmap, that have been allocated a radio resource.

Unfortunately, this group scheduling scheme does not currently handle multiple mobile stations sharing the same radio resource, which occurs for SDMA systems. Thus, there is a need for increasing the number of VoIP users by using spectrally efficient techniques such as SDMA, while efficiently controlling the control channel overhead using group scheduling.

SUMMARY OF THE INVENTION

In one aspect, the present invention provides for a method of assigning a radio resource in wireless communication system. The method includes establishing a group of mobile stations for group scheduling, and transmitting a mobile station presence bitmap to the group of mobile stations, the mobile station presence bitmap indicating which of the mobile stations are allocated a radio resource. The method further includes transmitting a spatial division multiple access (SDMA) bitmap to the group of mobile stations, the SDMA bitmap indicating a sub-group assignment for each of the mobile stations for which a radio resource is allocated.

In another aspect, the present invention provides for a method of receiving a radio resource assignment in a wireless communication system. The method includes receiving a group assignment, the group assignment containing a position indication, and determining if a radio resource has been allocated based on the position corresponding to the indicated position in a received mobile station presence bitmap. The method further includes determining a sub-group assignment based on a received SDMA bitmap, and determining a resource assignment based on the sub-group assignment.

In yet another aspect, the present invention provides for a base station having a processor and a computer readable medium storing programming for execution by the processor. The programming includes instructions to establish a group of mobile stations for group scheduling, and transmit a mobile station presence bitmap to the group of mobile stations, the mobile station presence bitmap indicating which of the mobile stations are allocated a radio resource. The programming includes further instructions to transmit a spatial division multiple access (SDMA) bitmap to the group of mobile stations, the SDMA bitmap indicating a sub-group assignment for each of the mobile stations for which a radio resource is allocated.

BRIEF DESCRIPTION OF THE DRAWINGS

FIG. 12 is a flow chart for exemplary mobile station operation.

DETAILED DESCRIPTION OF ILLUSTRATIVE EMBODIMENTS

The present disclosure can be described by the embodiments given below. It is understood, however, that the embodiments below are not necessarily limitations to the present disclosure, but are used to describe a typical implementation of the invention.

The present invention provides a unique method and apparatus for sharing a group resource in a wireless SDMA system. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry described herein are omitted, as such control circuits are within the skills of persons of ordinary skill in the relevant art.

Figure 1:
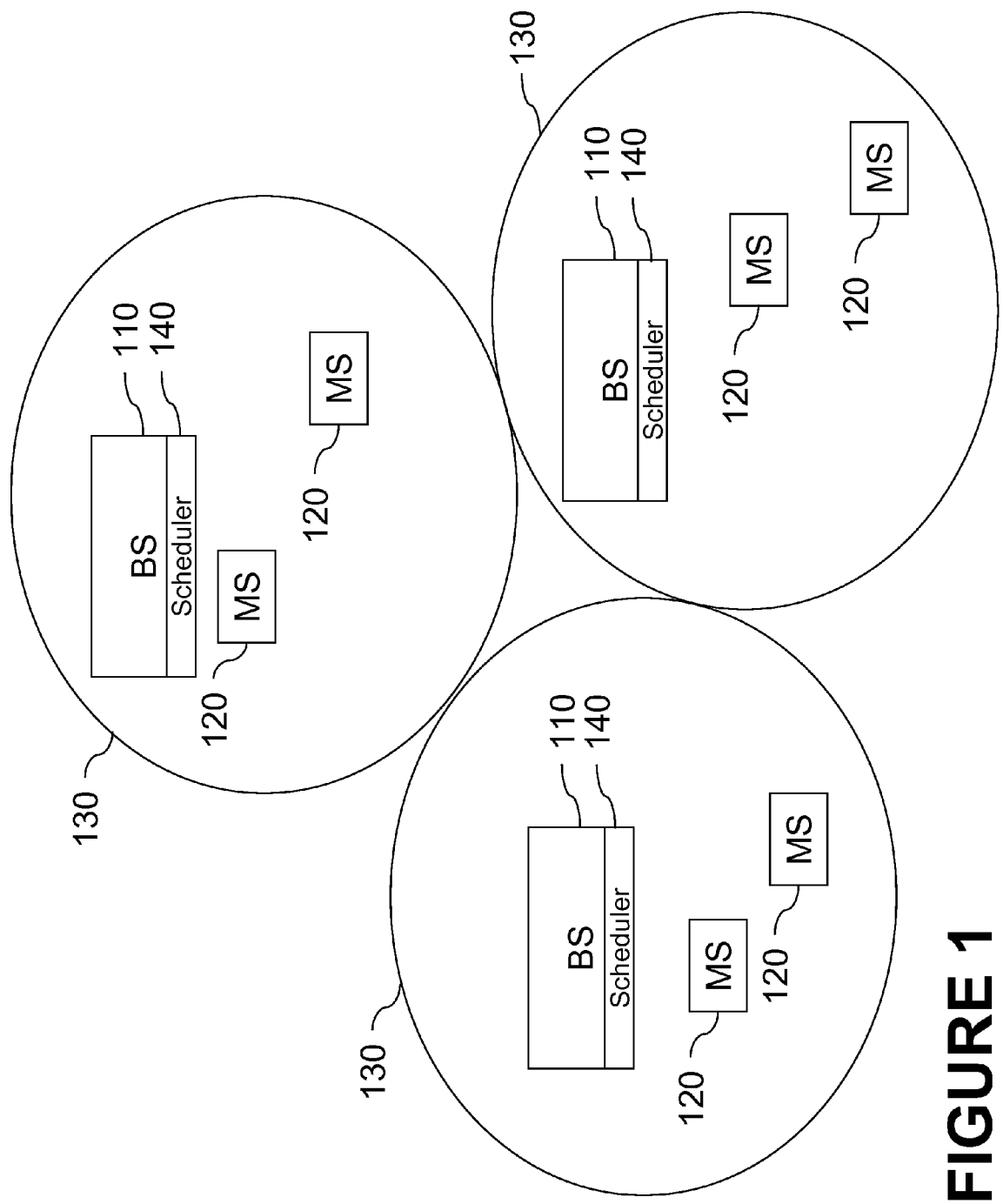
FIG. 1 illustrates a wireless communications network.

FIG. 1 is a wireless communications network comprising a plurality of base stations (BS) 110 providing voice and/or data wireless communication service to respective pluralities of mobile stations (MS) 120. The BS is also sometimes referred to by other names such as access network (AN), access point (AP), Node-B, etc. Each BS has a corresponding coverage area 130, sometimes referred to as a cell. Referring to FIG. 1, each base station includes a scheduler 140 for allocating radio resources to the mobile stations. Exemplary wireless communication systems include, but are not limited to, Evolved Universal Terrestrial Radio Access (E-UTRA) networks, Ultra Mobile Broadband (UMB) networks, IEEE 802.16 networks, and other OFDMA based networks. In some embodiments, the network is based on a multiple access scheme other than OFDMA. For example, the network can be a frequency division multiplex access (FDMA) network wherein the time-frequency resources are divided into frequency intervals over a certain time interval, a time division multiplex access (TDMA) network wherein the time-frequency resources are divided into time intervals over a certain frequency interval, and a code division multiplex access (CDMA) network wherein the resources are divided into orthogonal or pseudo-orthogonal codes over a certain time-frequency interval.

Figure 2:
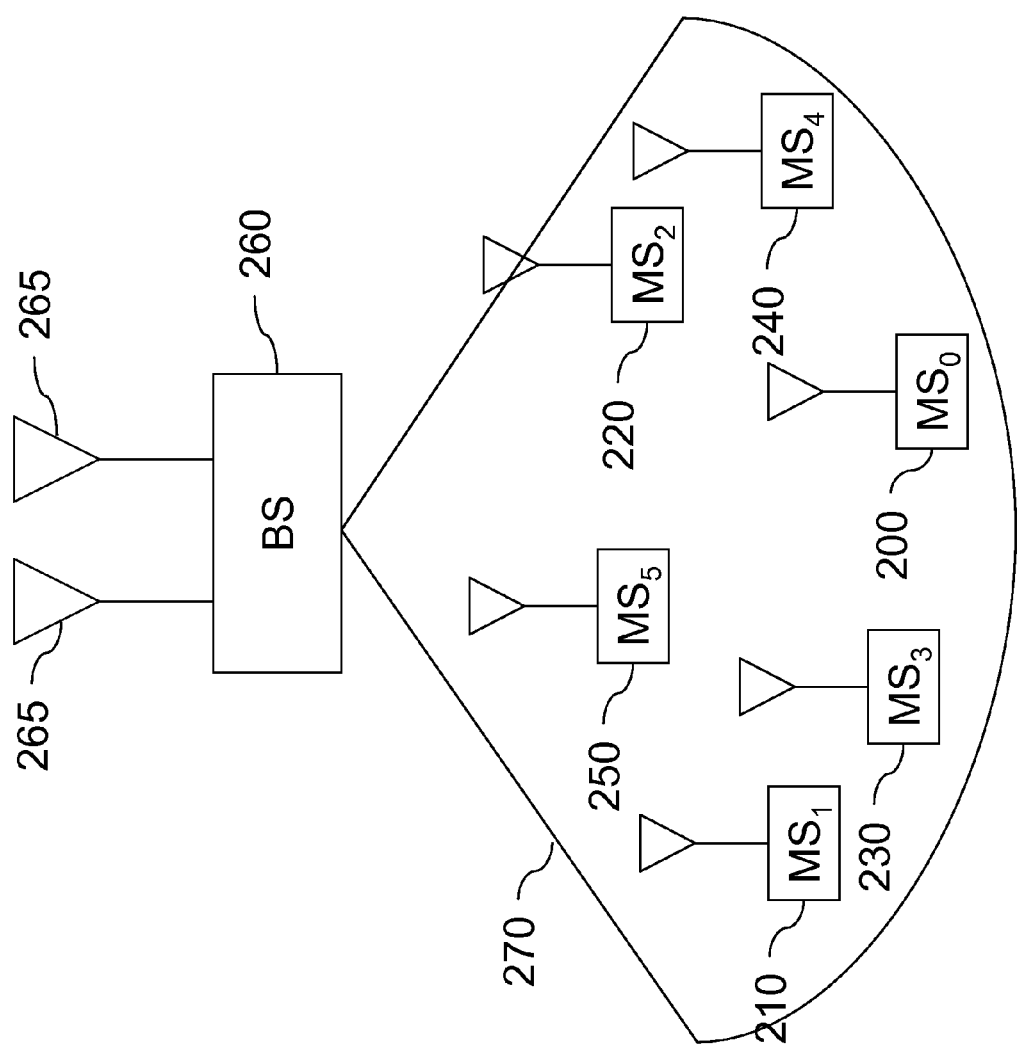
FIG. 2 illustrates a base station and several mobile stations from a wireless communications network.

FIG. 2 illustrates one base station and several mobile stations from the wireless communications network of FIG. 1. In FIG. 2, the base station is employed with two transmit antennas 265 making the base station capable of transmitting packets using one of several well known multiple antenna schemes. As is known in the art, the coverage area, or cell, of a base station 260 can be divided into, typically, three sub-coverage areas or sectors, one of which is shown as 270. Six exemplary mobile stations 200, 210, 220, 230, 240, 250 are in the shown coverage area.

Figure 3:
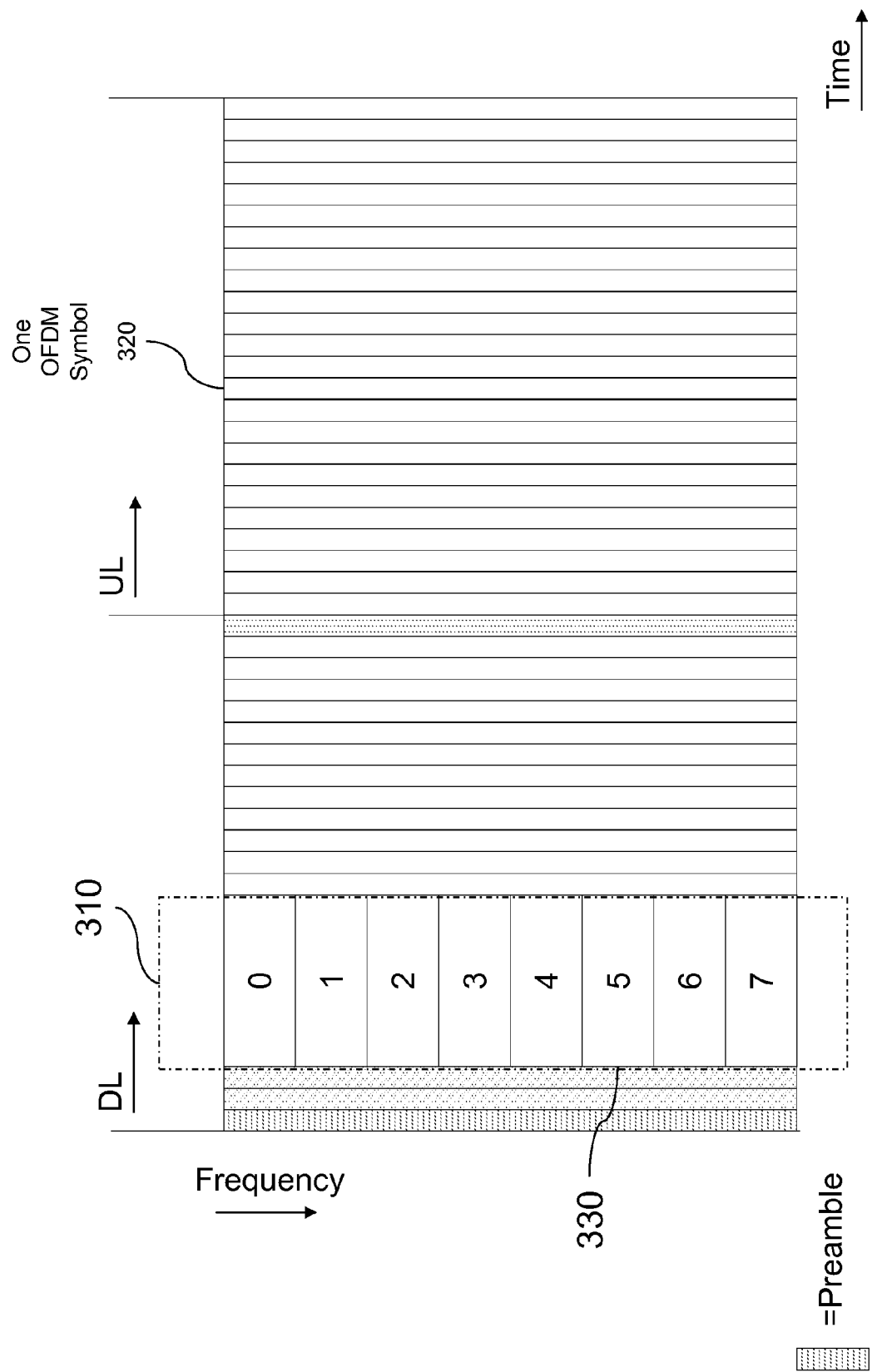
FIG. 3 illustrates an example set of OFDMA time-frequency radio resources suitable for group scheduling.

FIG. 3 is an example set of OFDMA time-frequency radio resources suitable for group scheduling. In OFDMA systems, the time-frequency resources are divided into OFDM symbols and OFDM subcarriers for allocation to the mobile stations by the base station scheduler. In an example OFDMA system, the OFDM subcarriers are approximately 10 kHz apart and the duration of each OFDM symbol is approximately 100 μsec. Referring to FIG. 3, the time-frequency resources correspond to a time division duplex (TDD) system, such as that defined by the IEEE 802.16e standard. In this exemplary embodiment, the resources in the time domain (x-axis) are divided into two equal portions; denoted as downlink (DL), and uplink (UL). The DL and UL are further divided into 24 OFDM symbols 320. The first DL OFDM symbol is allocated for the preamble, which is used for timing and frequency synchronization by the mobile stations. The second and third DL OFDM symbols are used to transmit control information. In this example, the fourth through eleventh DL OFDM symbols are allocated as a set of shared time-frequency resources 310 for group scheduling. The twenty-fourth OFDM DL OFDM symbol is allocated as a guard period 335. In the frequency domain (y-axis), the fourth through eleventh DL OFDM symbols are further divided into eight subchannels 330. The subchannels contain 48 usable OFDM subcarriers that are either contiguous or distributed across a larger bandwidth, where a usable OFDM subcarrier is one that can be used for data transmission, i.e. non-pilot. In FIG. 3, the set of shared time-frequency resources 310 are numbered 0-7.

In FIG. 3, each of the time-frequency resources (0-7) is a logical representation of a portion of the time-frequency resources of the system. Each logical time-frequency resource maps to a physical time-frequency resource. The mapping of logical time-frequency resources to physical time-frequency resources depends on which subcarrier permutation is being used, such as the subcarrier permutations defined by the IEEE 802.16 standard. The mapping of logical time-frequency resources to physical time-frequency resources can change with time and can depend on one or more parameters defined by the system.

Figure 4:
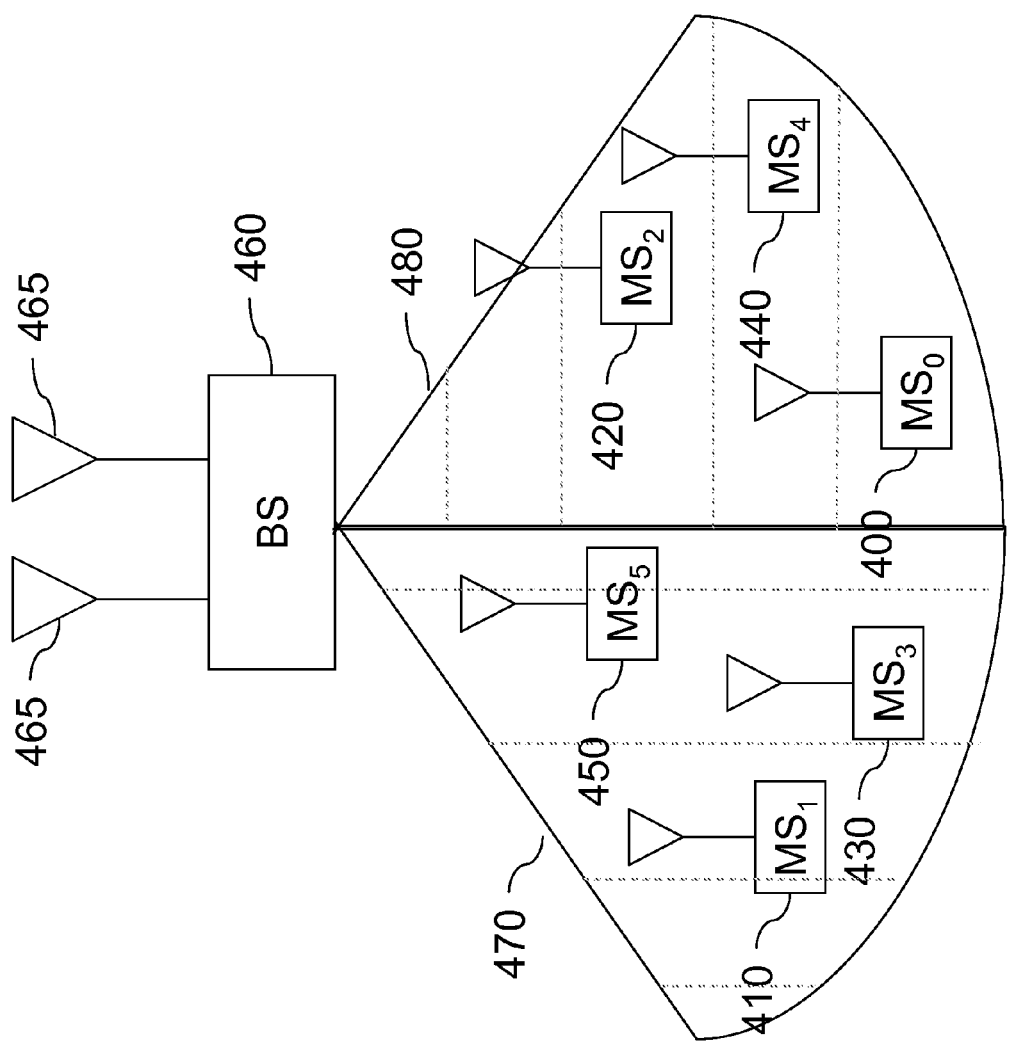
FIG. 4 illustrates an SDMA base station and several mobile stations from a wireless communications network.

FIG. 4 illustrates one base station and several mobile stations, such as from the wireless communications network of FIG. 1. The configuration of the base station 460 and mobile stations 400, 410, 420, 430, 440, and 450 is identical to that of FIG. 2. Base station 460 is employed with two transmit antennas 465. Base station 460 uses its multiple transmit antennas 465 to employ a well known multiple antenna scheme known as SDMA. In SDMA, a base station serves multiple mobile stations on the same time-frequency resource using different effective antenna patterns. For example, referring to FIG. 4, base station 460 creates six distinct coverage areas, two of which are shown 470 and 480. As a result, base station 460 can serve two different mobile stations on the same resource if the mobile stations are spatially separated. Base station 460 relies on measurements to determine in which coverage area a mobile station is located. The measurements can be made at the mobile station and fed back to the base station on a feedback channel or can be made at the base station. TDD systems are well suited for making channel measurements at the base station, since channel reciprocity can be assumed by the base station. As an example, consider $MS_1$ and $MS_4$. In a TDD system, base station 460 can determine whether the mobile stations are in coverage area 470 or coverage area 480. Then, a base station scheduler, such as scheduler 140 illustrated in FIG. 1, can assign $MS_1$ and $MS_4$ to the same time frequency resources, for example resource 0 of FIG. 3. Since base station 460 uses two distinct effective antenna patterns for $MS_1$ and $MS_4$, interference seen at $MS_4$ for transmission to $MS_1$ is minimized. Similarly, for uplink traffic, the same resource can be shared using SDMA. To distinguish the mobile stations sharing the same resource, different pilot patterns can be transmitted by the two mobile stations.

Figure 5:
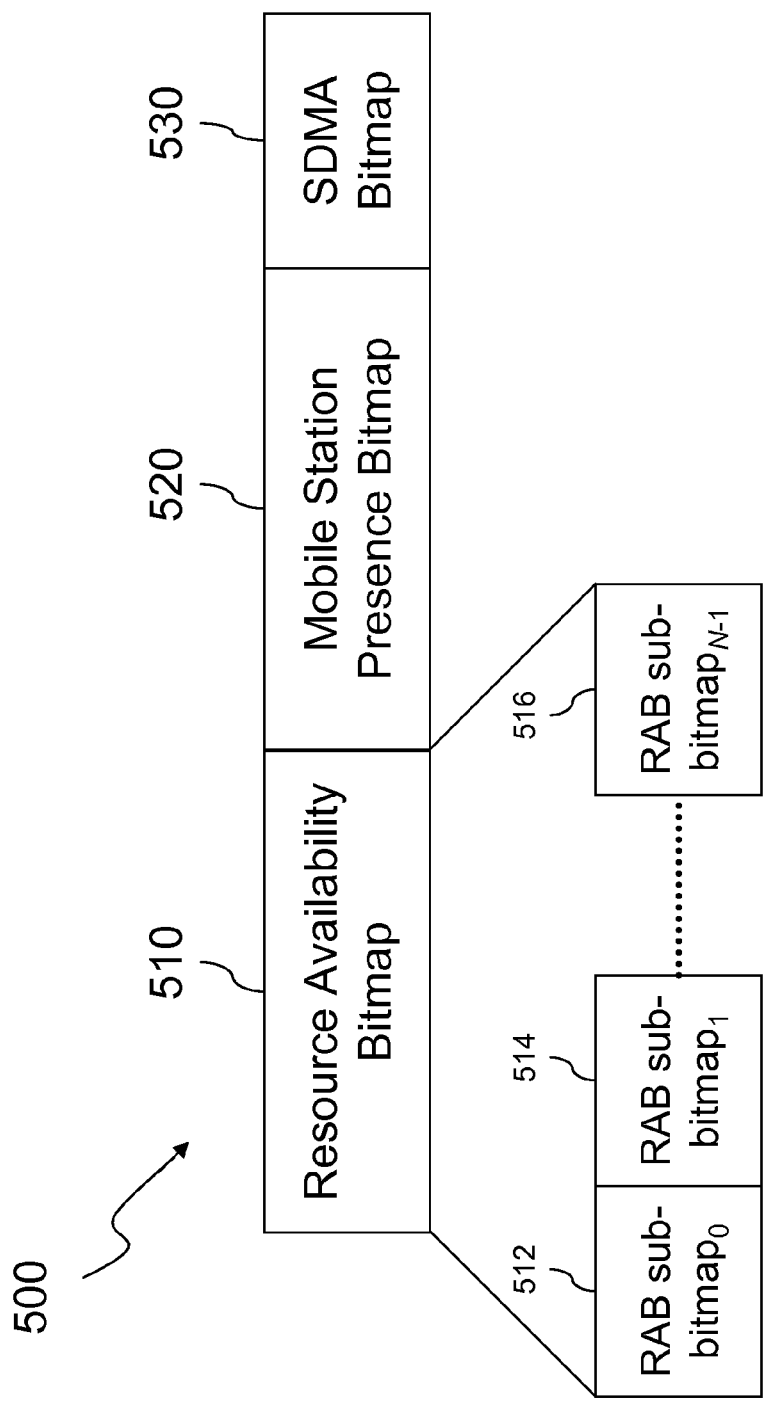
FIG. 5 illustrates a group scheduling scheme.

For a VoIP system, base station 460 can effectively double the number of available time-frequency resources using a scheme similar to that shown in FIG. 4. Current group scheduling schemes do not facilitate the assignment of the same resource to different mobile stations, however. Thus, FIG. 5 is provided to illustrate a preferred embodiment scheme for sharing a group resource. In FIG. 5, exemplary group scheduling bitmap 500 is shown. Group scheduling bitmap 500 is divided into three parts, a resource availability bitmap (RAB) 510, a mobile station presence bitmap 520, and an SDMA bitmap 530. The resource availability bitmap is further subdivided into N RAB sub-bitmaps, denoted RAB sub-bitmap$_0$ 512, RAB sub-bitmap$_1$ 514, and RAB sub-bitmap$_{N-1}$ 516. In some embodiments, resource availability bitmap 510 is not used. As in the prior art, a group of mobile stations is established which monitor group scheduling bitmap 500 to determine a resource allocation. The group of mobile stations is assigned a set of shared time-frequency resources, such as resource 0 through 7 of FIG. 3. Each mobile station is assigned a bit position in mobile station presence bitmap 520 to determine if it is allocated one of the shared time-frequency resources. For example, if the bit of mobile station presence bitmap 520 corresponding to a particular mobile station is a '1', the mobile station is assigned one of the shared time-frequency resources, and if the bit is a '0', the mobile station is not assigned one of the shared time-frequency resources.

SDMA bitmap 530 is used to divide the mobile stations monitoring the mobile station presence bitmap 520 into two or more sub-groups. The mobile station corresponding to the Nth '1' in the mobile station presence bitmap 520 determines its sub-group assignment by examining the Nth position in the SDMA bitmap 530. The number of sub-groups is equal to the number of times the same time-frequency resource can be used by a base station. For example, referring to FIG. 4, each resource can be used twice, since there are two coverage areas 470, 480. Therefore, there are two sub-groups. If there are two sub-groups, the Nth position in the SDMA bitmap is one bit wide, if there are four sub-groups, the Nth position in the SDMA bitmap is two bits wide, etc.

Mobile stations determine their sub-group assignment using SDMA bitmap 530, and create an effective mobile station presence bitmap, by, e.g., setting all of the '1's in the mobile station presence bitmap to '0' for mobile stations that are not in the same sub-group.

For supporting SDMA, resource availability bitmap 510 contains RAB sub-bitmaps 512, 514, 516. Like the number of sub-groups, the number of RAB sub-bitmaps is equal to the number of times the same time-frequency resource can be used by the base station. Each bit in each of the RAB sub-bitmaps corresponds to one of the shared time-frequency resources. If the corresponding resource is used, base station 460 indicates this to the mobile stations 410, 420, 430, etc., by, e.g., setting the bit to '1'. The mobile stations determine which of the RAB sub-bitmaps to monitor based on the value in SDMA bitmap 530. Mobile stations assigned to sub-group 0 monitor RAB sub-bitmap$_0$, mobile station assigned to sub-group 1 monitor RAB sub-bitmap$_1$, etc.

Mobile stations determine their resource assignment within the set of available resources preferably by determining the number of mobile stations with smaller bitmap positions in the effective mobile station presence bitmap that have been allocated a resource. The Nth mobile station indicated as active in the effective mobile station presence bitmap for sub-group j is allocated the Nth available resource from the set of shared resources for sub-group j.

If resource availability bitmap 510 is not used, the set of available resources is the entire set of shared time-frequency resources. If resource availability bitmap 510 is used, the set of available resources for the jth group is the entire set of shared time-frequency resources minus those resources that are indicated as being used by RAB sub-bitmap$_j$.

Figure 5A:
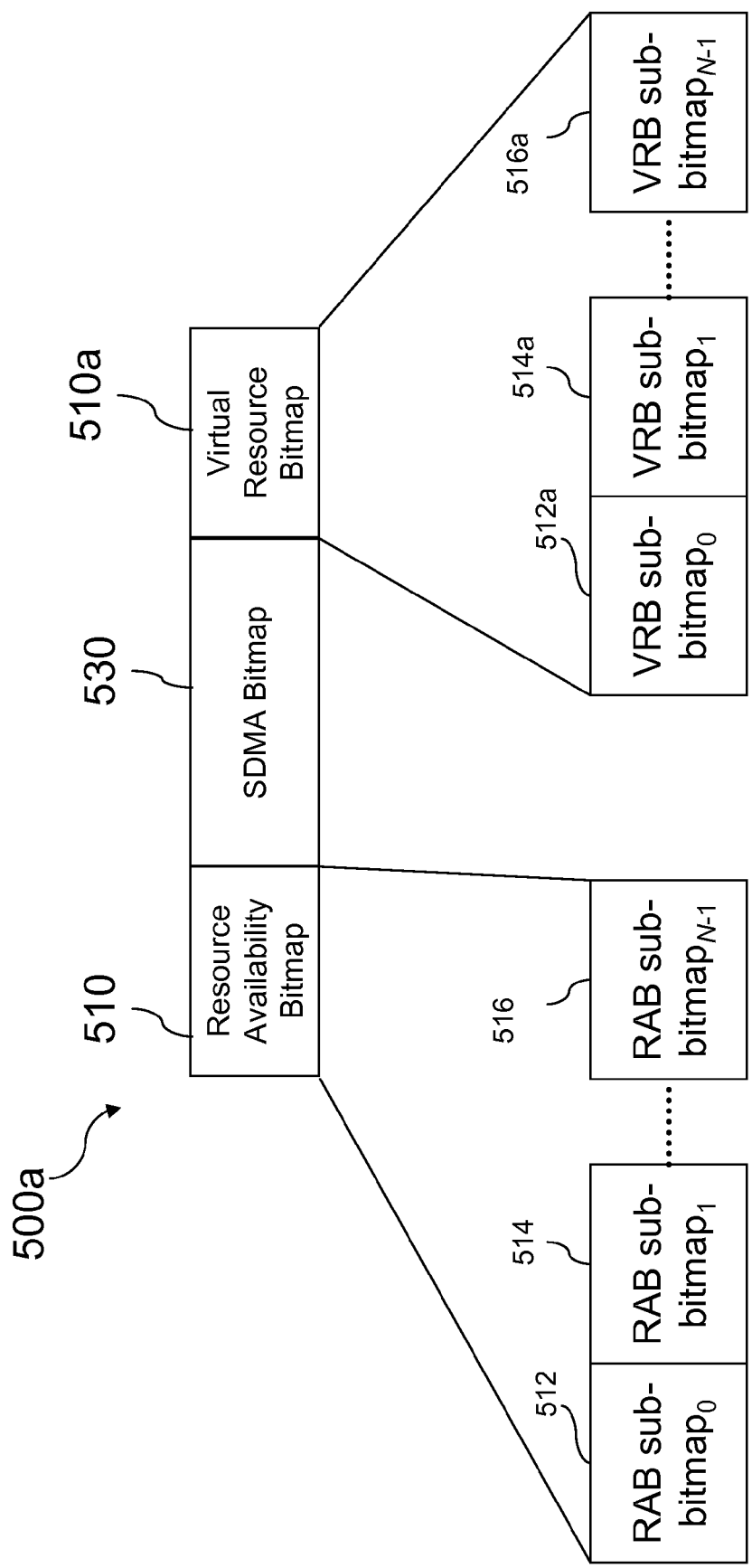
FIGS. 5A and 5B illustrate an alternative embodiment group scheduling scheme in which virtual resources are assigned and mapped to real resources.

FIG. 5A illustrates an alternate preferred embodiment in which virtual resources, which correspond to real resources, are assigned to the mobile stations. Group scheduling bitmap 500a includes virtual resource bitmap 511, which maps virtual resources for assignment to the mobile stations. The use of virtual resources for assigning resources is discussed in great detail in commonly assigned and co-pending patent application Ser. No. 12/134,025 and in Provisional Patent Application No. 60/944,462, both of which are incorporated herein by reference. As shown, virtual resource bitmap 510a contains RAB sub-bitmaps 512a, 514a, 516a, for supporting SDMA. These virtual resource sub-bitmaps operate on a per group basis analogously to real resource sub-bitmaps 512, 514, and 516. Although group scheduling bitmap 500a is shown without a mobile station presence bitmap, this bitmap could be included as well in some embodiments.

Figure 5B:
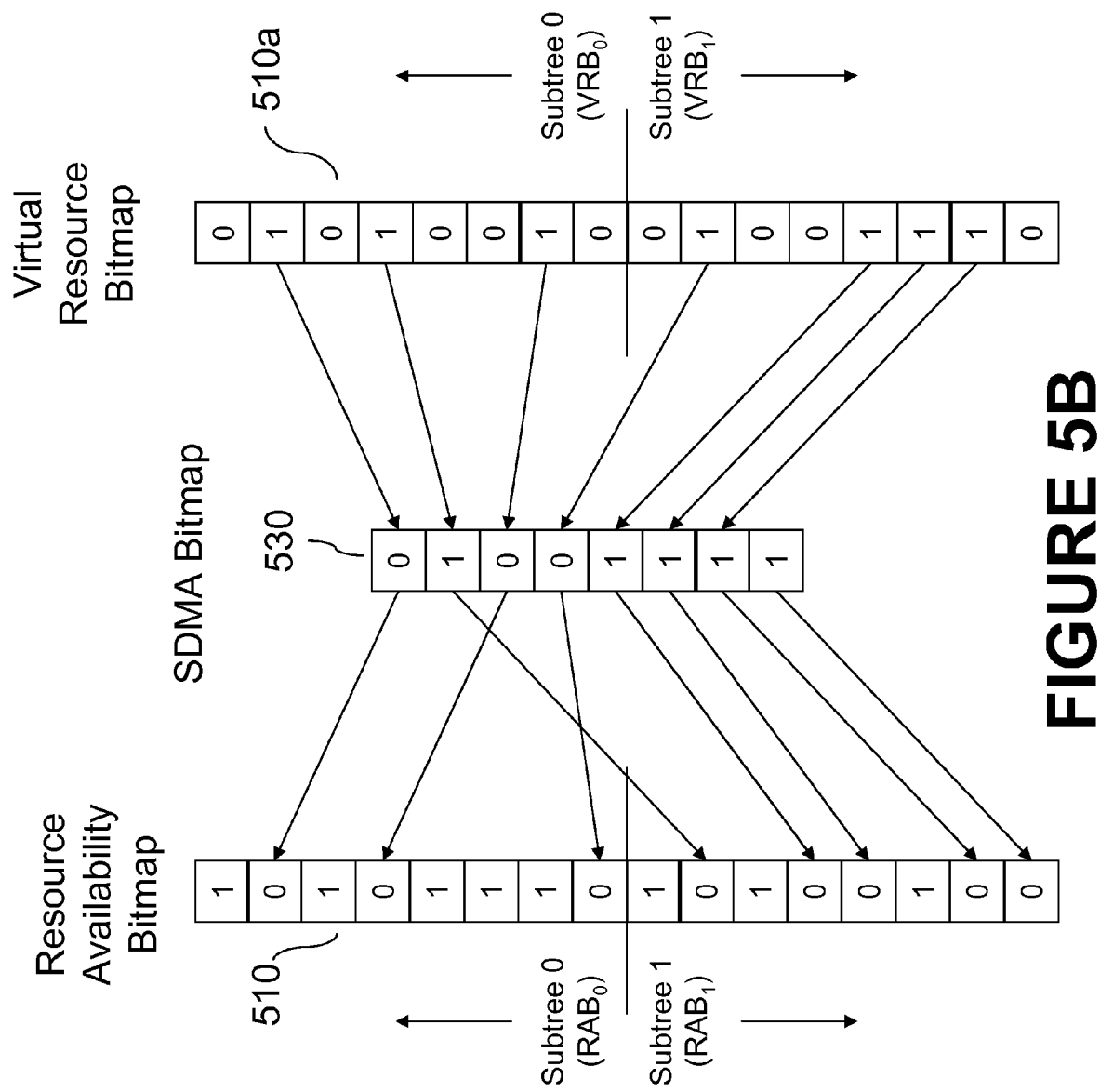

FIG. 5B illustrates and exemplary manner in which virtual assigned resources are mapped to real resources using SDMA bitmap 530. In the illustrated example were the coverage area is divided into two groups, SDMA bitmap 530 indicates whether virtual resources in sub-group 0 or sub-group 1 are being mapped to real resources in sub-group 0 or sub-group 1. Consistent with the above described exemplary algorithm (described with respect to FIG. 5), the mobile station corresponding to the Nth '1' in virtual resource bitmap 510a monitors the Nth position in SDMA bitmap 530 to determine whether it should monitor RAB0 or RAB1 for determining its real resources. It will be apparent to one skilled in the art that the use of virtual resource bitmap 510a in conjunction with real resource bitmap 510 can be applied to each of the following described embodiments.

Figure 6:
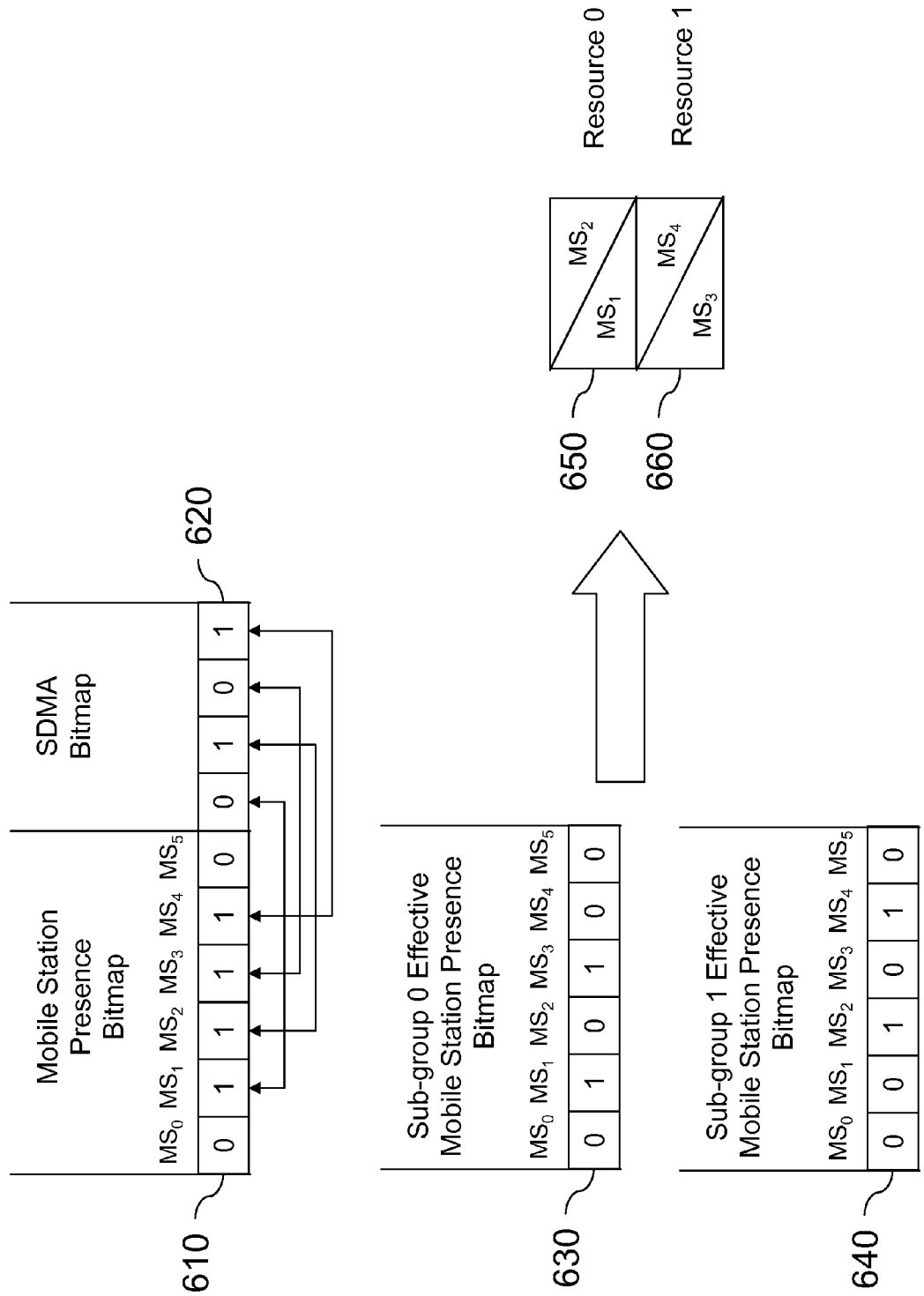
FIGS. 6, 7, and 8 are illustrative examples of the group scheduling scheme of FIG. 5.

FIG. 6 provides an illustrative example of the group scheduling bitmap 500 of FIG. 5. Referring to FIG. 6, consider that a group of 6 mobile stations, denoted MS$_0$, MS$_1$, MS$_2$, MS$_3$, MS$_4$, and MS$_5$, has been established by the base station. The base station establishes the group by transmitting a group assignment message to each mobile station containing an indication of its position assignment within the group and optionally an indication of the set of shared time-frequency resources (the group resources). If the entire set of OFDMA resources is used for group scheduling, the base station does not need to transmit an indication of the set of shared time-frequency resources. Further, consider that the mobile stations are situated as shown in FIG. 4, and that the base station has established coverage areas 470 and 480 of FIG. 4. Each mobile station in the group monitors a group scheduling bitmap containing a mobile station presence bitmap 610 and an SDMA bitmap 620. The group is assigned two shared resources 650 and 660, denoted resource 0 and resource 1. Further, consider that the base station scheduler has determined to allocate resources to MS$_1$, MS$_2$, MS$_3$, and MS$_4$. The scheduler then constructs the group scheduling bitmap based on the known algorithm of processing the group scheduling bitmap at the mobile station. Based on mobile station presence bitmap 610, MS$_1$, MS$_2$, MS$_3$, and MS$_4$ are indicated as active. MS$_1$ and MS$_3$ are in coverage area 470, and MS$_2$ and MS$_4$ are in coverage area 480. Base station 460 uses the SDMA bitmap 620 to establish sub-group 0 and sub-group 1. MS$_1$ and MS$_3$ are assigned to sub-group 0 using SDMA bitmap 620, and MS$_2$ and MS$_4$ are assigned to sub-group 1 using SDMA bitmap 620. The mobile station corresponding to the Nth '1' in mobile station presence bitmap 610 determines its sub-group assignments based on the Nth position in the SDMA bitmap 620, illustrated by the arrows connecting the mobile station presence bitmap 610 to the SDMA bitmap 620. Mobile stations in sub-group 0 create an effective mobile station presence bitmap 630 by inserting '0's in the mobile station presence bitmap for all mobile stations not assigned to sub-group 0. Mobile stations in sub-group 1 create an effective mobile station presence bitmap 640 by inserting '0's in the mobile station presence bitmap for all mobile stations not assigned to sub-group 1.

Mobile stations in sub-group 0 determine their resource allocation based on the effective mobile station presence bitmap for sub-group 0 630. The mobile station corresponding to the Nth '1' in the effective mobile station presence bitmap for sub-group 0 630 is allocated the Nth available resource from the set of shared time-frequency resources. In this case, the available resources are resource 0 and resource 1, since a resource availability bitmap is not being used. Consequently, $MS_1$ determines that it is allocated resource 0 650 and $MS_3$ determines that it is allocated resource 1 660.

Mobile stations in sub-group 1 determine their resource allocation based on the effective mobile station presence bitmap for sub-group 1 640. The mobile station corresponding to the Nth '1' in the effective mobile station presence bitmap for sub-group 1 640 is allocated the Nth available resource from the set of shared time-frequency resources. In this case, the available resources are resource 0 and resource 1, since a resource availability bitmap is not being used. Consequently, $MS_2$ determines that it is allocated resource 0 650 and $MS_4$ determines that it is allocated resource 1 660. Due to the spatial separation of mobile stations in sub-group 0 and sub-group 1, the mobile stations in one sub-group do not need to know how resources are allocated to the mobile stations in the other sub-group.

Once a mobile station determines its allocated resource, the mobile station receives a packet on the physical time-frequency resources corresponding to the determined time-frequency resource or transmits a packet to the base station on the physical time-frequency resource corresponding to the determined time-frequency resource.

Figure 7:
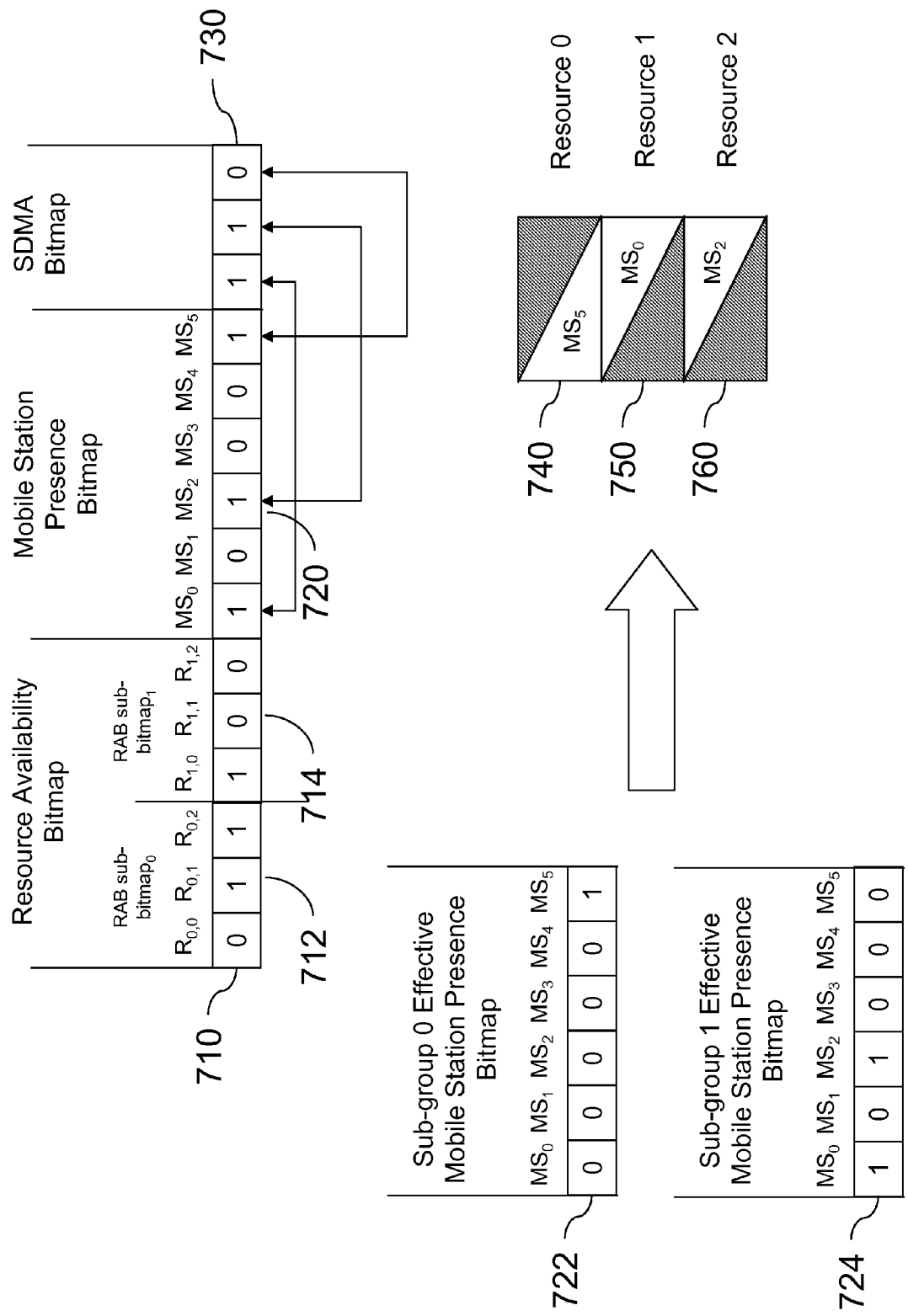

FIG. 7 provides another illustrative example of the group scheduling bitmap of FIG. 5. Referring to FIG. 7, consider that a group of 6 mobile stations, denoted $MS_0$, $MS_1$, $MS_2$, $MS_3$, $MS_4$, and $MS_5$, has been established by the base station. The base station establishes the group by transmitting a group assignment message to each mobile station containing an indication of its position assignment within the group and optionally an indication of the set of shared time-frequency resources (the group resources). Further, consider that the mobile stations are situated as shown in FIG. 4, and that the base station has established the two coverage areas 470 and 480 of FIG. 4. Each mobile station in the group monitors a group scheduling bitmap containing a resource availability bitmap 710 comprising RAB sub-bitmap$_0$ 712 and RAB sub-bitmap$_1$ 714, a mobile station presence bitmap 720 and an SDMA bitmap 730. The group is assigned three shared resources 740, 750, and 760, denoted resource 0, resource 1, and resource 2. Further, consider that the base station scheduler has determined to allocate resources to $MS_0$, $MS_2$, and $MS_5$. The scheduler then constructs the group scheduling bitmap based on the known algorithm of processing the group scheduling bitmap at the mobile station. Based on the mobile station presence bitmap 720, $MS_0$, $MS_2$, and $MS_5$ are indicated as active. $MS_5$ is in coverage area 470, and $MS_0$ and $MS_2$ are in coverage area 480. The base station uses the SDMA bitmap 730 to establish sub-group 0 and sub-group 1.

$MS_5$ is assigned to sub-group 0 using the SDMA bitmap 730, and $MS_0$ and $MS_2$ are assigned to sub-group 1 using the SDMA bitmap 730. The mobile station corresponding to the Nth '1' in the mobile station presence bitmap 720 determines its sub-group assignments based on the Nth position in the SDMA bitmap 730, illustrated by the arrows connecting the mobile station presence bitmap 720 to the SDMA bitmap 730. Mobile stations in sub-group 0 create an effective mobile station presence bitmap 722 by inserting '0's in the mobile station presence bitmap for all mobile stations not assigned to sub-group 0. Mobile stations in sub-group 1 create an effective mobile station presence bitmap 724 by inserting '0's in the mobile station presence bitmap for all mobile stations not assigned to sub-group 1.

Mobile stations in sub-group 0 determine their respective resource allocation based on the effective mobile station presence bitmap for sub-group 0 722 and RAB sub-bitmap$_0$. The Nth bit position in each RAB sub-bitmap corresponds to the Nth resource from the set of shared time-frequency resources. In this case, bit position 0 corresponds to resource 0, bit position 1 corresponds to resource 1, and bit position 2 corresponds to resource 2. The base station sets a bit to '1' in RAB sub-bitmap j to indicate to the mobile stations of sub-groups that the corresponding resource is currently in use. Based on RAB sub-bitmap$_0$, the mobile stations of sub-group 0 determine that resource 1 and resource 2 are not available. Similarly, based on RAB sub-bitmap$_1$, the mobile stations of sub-group 1 determine that resource 0 is not available.

The mobile station corresponding to the Nth '1' in the effective mobile station presence bitmap for sub-group 0 722 is allocated the Nth available resource from the set of shared time-frequency resources. In this case, the mobile stations in sub-group 0 determine the set of available resources by subtracting those resources that are indicated as being used by RAB sub-bitmap$_0$ 712 from the entire set of shared time-frequency resources. Consequently, $MS_5$ determines that it is allocated resource 0 740.

The mobile station corresponding to the Nth '1' in the effective mobile station presence bitmap for sub-group 1 724 is allocated the Nth available resource from the set of shared time-frequency resources. In this case, the mobile stations in sub-group 1 determine the set of available resources by subtracting those resources that are indicated as being used by RAB sub-bitmap$_1$ 714 from the entire set of shared time-frequency resources. Consequently, $MS_0$ determines that it is allocated resource 1 750 and $MS_2$ determines that it is allocated resource 2. Again, due to the spatial separation of mobile stations in sub-group 0 and sub-group 1, the mobile stations in one sub-group do not need to know how resources are allocated to the mobile stations in the other sub-group.

Figure 8:
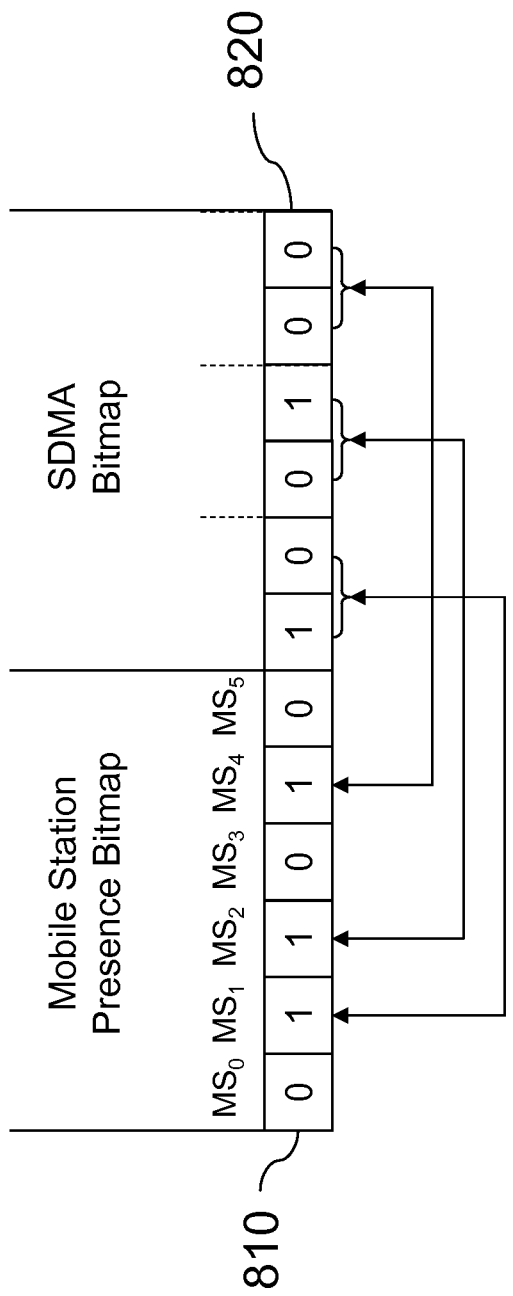

FIG. 8 provides another illustrative example of the group scheduling bitmap of FIG. 5. Referring to FIG. 8, consider that a group of 6 mobile stations, denoted $MS_0$, $MS_1$, $MS_2$, $MS_3$, $MS_4$, and $MS_5$, has been established by the base station. Further, consider that the base station will use mobile station presence bitmap 810 and SDMA bitmap 820 for resource allocation. Finally, consider that the base station has four transmit antennas, thereby allowing four effective antenna patterns and four distinct coverage areas. In such a system, the base station can use each radio resource four times. As a result, SDMA bitmap 820 contains two bits per active mobile station, thereby allowing the creation of four sub-groups. Referring to FIG. 8 and the arrows connecting the mobile station presence bitmap 810 to the SDMA bitmap 820, $MS_1$ is assigned to subgroup '10', $MS_2$ is assigned to subgroup '01', and $MS_4$ is assigned to sub-group '00'. Other variations to the assignment scheme will be apparent to those skilled in the art.

Figure 9:
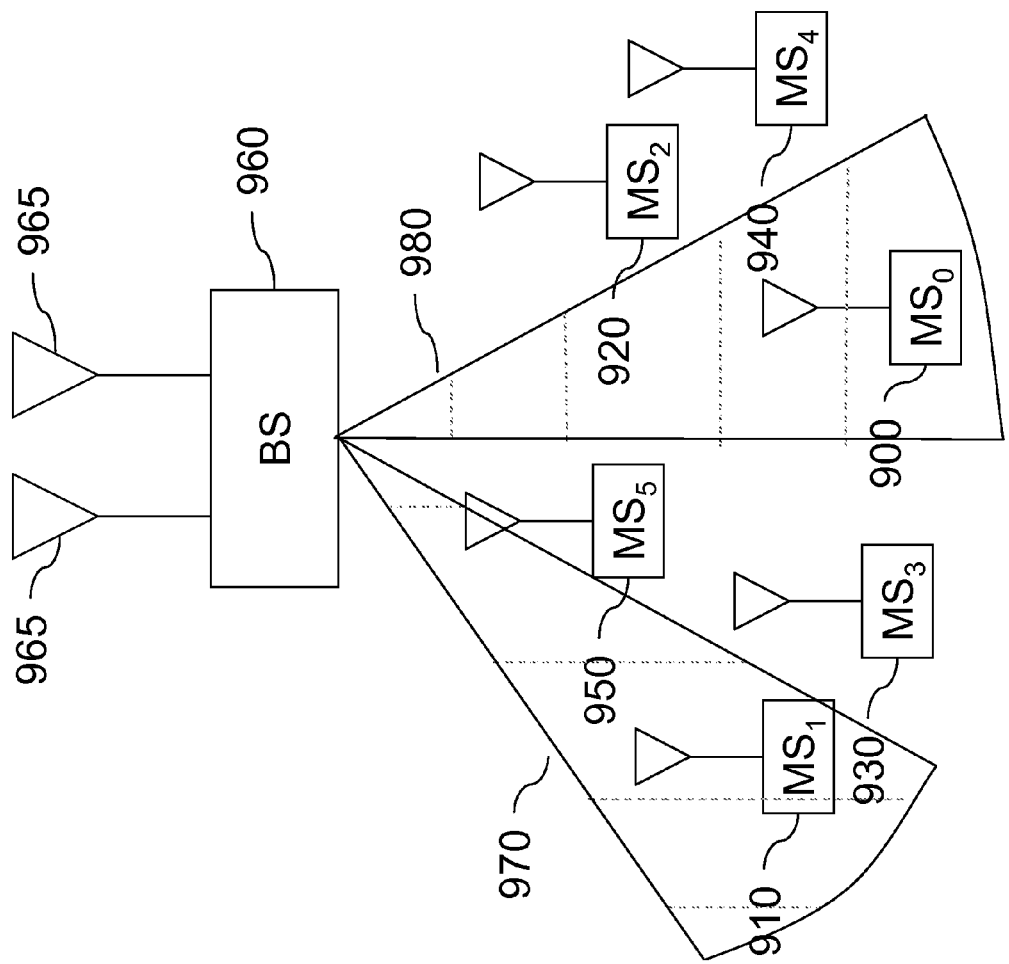
FIGS. 9 and 10 illustrate an SDMA base station and several mobile stations from a wireless communications network.
Figure 10:
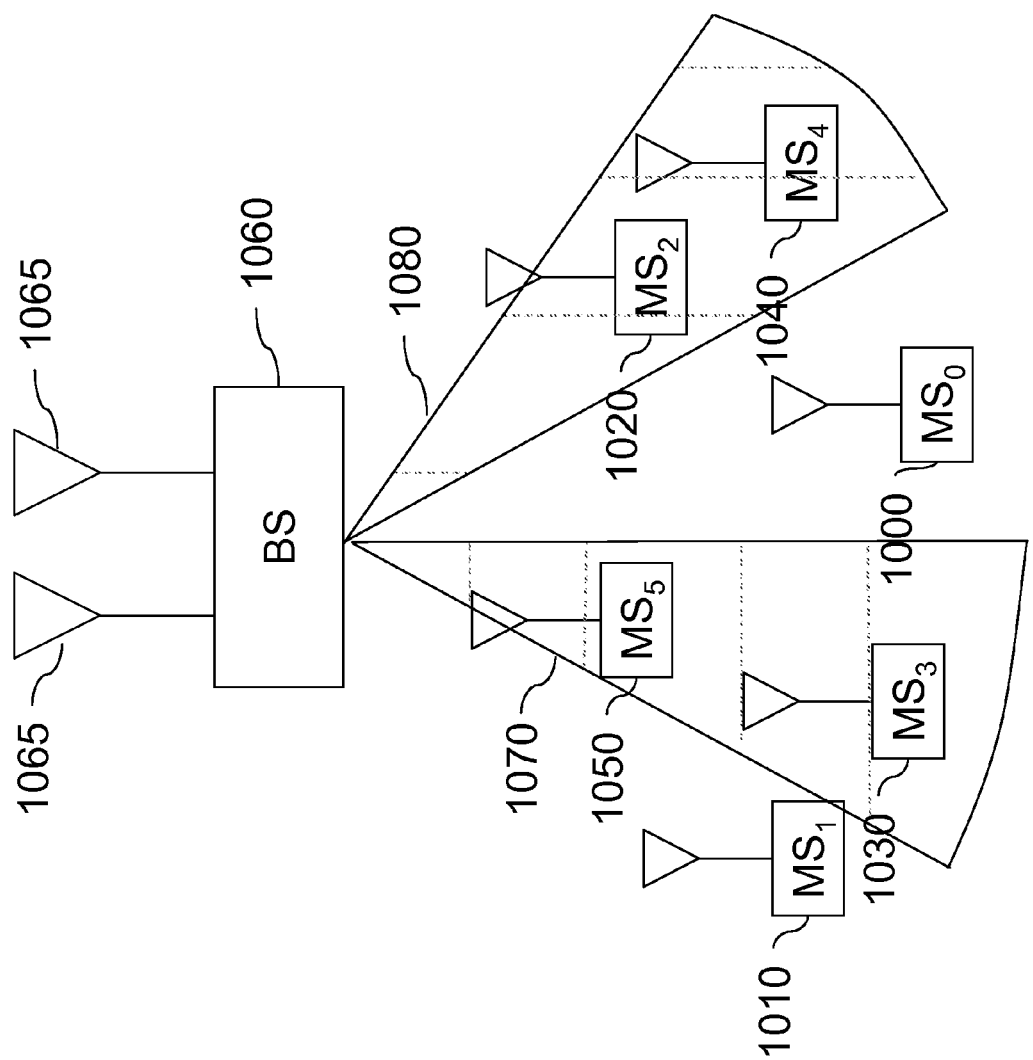

FIGS. 9 and 10 illustrate an SDMA base station and several mobile stations from a wireless communications network. Referring to FIG. 9, the configuration of the base station 960 and mobile stations 900, 910, 920, 930, 940, and 950 is identical to that of FIG. 4. Base station 960 is employed with two transmit antennas 965. Similar to the base station of FIG. 4, base station 960 creates six distinct coverage areas, two of which are shown 970 and 980. In this embodiment, base station 960 intentionally creates coverage areas which do not cover the entire desired coverage area. This is done to increase the channel quality of mobile stations in the shown coverage areas 970 and 980. To allow service to all mobile stations, the base station changes the coverage areas with time. For example, FIG. 10 is provided to show two different coverage areas that can be created by the same base station at an instant in time subsequent to the instant of time illustrated in FIG. 9. Based on FIGS. 9-10, each mobile station is in the base stations coverage area at one of the two instants in time. The base station alternates between the coverage area of FIG. 9 and the coverage area of FIG. 10. Other coverage areas could be included at yet other instances of time.

Figure 11:
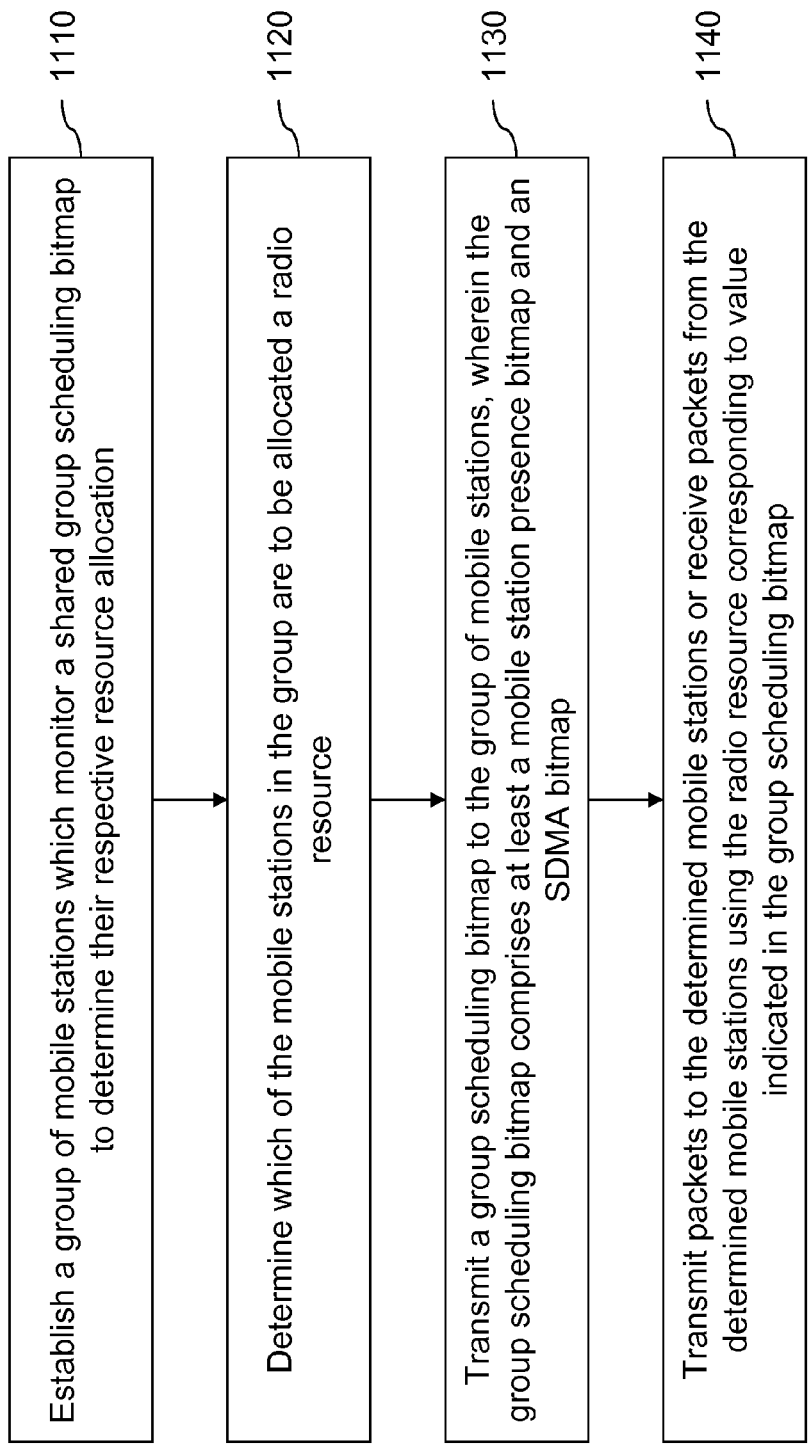
FIG. 11 is a flow chart for exemplary base station operation.

FIG. 11 is a flow chart for base station operation. Referring to FIG. 11, at step 1110, the base station establishes a group of mobile stations which monitor a shared group scheduling bitmap to determine their respective resource allocation. The base station establishes a group of mobile stations by informing the mobile stations of their respective position assignments within the group (which bitmap position to monitor) and optionally an indication of the set of shared time-frequency resources. This indication can be sent using a group assignment message. At step 1120, the base station scheduler determines which of the mobile stations in the group are to be allocated a radio resource. At step 1130, the base station transmits a group scheduling bitmap to the group of mobile stations. The group scheduling bitmap contains a mobile station presence bitmap, an SDMA bitmap, and optionally, a resource availability bitmap. The bitmaps are used by the base station to indicate the allocation of specific resources to specific mobile stations within the group. The SDMA bitmap is used by the base station to create sub-groups, wherein members of different sub-groups can share the same time-frequency resource using antennas techniques such as SDMA. The resource availability bitmap, if used, contains RAB sub-bitmaps, which indicate which of the set of shared time-frequency resources are in use for each sub-group. At step 1140, the base station transmits packets to the determined mobile stations or receives packets from the determined mobile stations using the radio resource corresponding to the resource indicated in the group scheduling bitmap.

FIG. 12 is a flow chart for mobile station operation. Referring to FIG. 12, at step 1210, the mobile station receives a group assignment from the base station. The group assignment contains an indication of the mobile stations position within the group (which bitmap position to monitor) and optionally an indication of the set of shared time-frequency resources. At step 1220, the mobile station receives a group scheduling bitmap from the base station. The group scheduling bitmap contains a mobile station presence bitmap, an SDMA bitmap, and optionally, a resource availability bitmap. The bitmaps are used by the mobile station to determine its specific resource assignment from within a set of shared time-frequency resources. The SDMA bitmap is used by the mobile station to determine its sub-group assignment, wherein members of different sub-groups can share the same time-frequency resource using antennas techniques such as SDMA. The resource availability bitmap, if used, contains RAB sub-bitmaps, which indicate which of the set of shared time-frequency resources are in use for each sub-group. At step 1230, the mobile station determines its resource allocation using the group scheduling bitmap. At step 1240, the mobile station transmits a packet to the base station or receives a packet from the base station on the determined resource.

What is claimed is:

1. A method of assigning a radio resource in wireless communication system, the method comprising:
   establishing a group of mobile stations for group scheduling, the group of mobile stations being divided into a plurality of sub-groups of mobile stations; and
   transmitting a common bitmap to each mobile station in the group of mobile stations, the common bitmap comprising:
   (a) a mobile station presence bitmap indicating that first and second mobile stations in the group of mobile stations are allocated a same time-frequency resource; and
   (b) a spatial division multiple access (SDMA) bitmap indicating that the first mobile station and the second mobile station are assigned to different sub-groups.

2. The method of claim 1, wherein the wireless communication system is an orthogonal frequency division multiplexing based (OFDMA-based) system.

3. The method of claim 1, further comprising establishing two groups of mobile stations for group scheduling.

4. The method of claim 1, wherein sub-group assignment is assigned as a virtual resource, which virtual resource is mapped to a real resource using a bitmap that maps virtual resources to real resources.

5. The method of claim 1, wherein the common bitmap further comprises a resource availability bitmap that identifies resources that are available.

6. The method of claim 5, wherein the resource availability bitmap is divided into N resource availability sub-bitmaps, wherein N is equal to the number of groups of mobile stations.

7. The method of claim 5, wherein each bit of the resource availability bitmap corresponds to a shared time-frequency resource.

8. The method of claim 1, wherein the mobile station presence bitmap indicates which mobile stations are allocated a radio resource, and wherein the SDMA bitmap indicates a sub-group assignment for each of the mobile stations for which a radio resource is allocated.

9. A method of receiving a radio resource assignment in a wireless communication system, the method comprising:
   receiving a group assignment, the group assignment containing a position indication; and
   receiving, by a mobile station, a common bitmap comprising both a mobile station presence bitmap and a spatial division multiple access (SDMA) bitmap, wherein the mobile station presence and SDMA bitmaps indicate that an allocated time-frequency resource is shared with another mobile station that is assigned to a different a sub-group.

10. The method of claim 9, wherein the wireless communication system is an OFDMA-based system.

11. The method of claim 9, wherein the common bitmap further comprises a resource availability bitmap that identifies time-frequency resources that are available.

12. The method of claim 11, wherein the resource availability bitmap is divided into N resource availability sub-bitmaps, wherein N is equal to the number of groups of mobile stations in a base station cell.

13. The method of claim 11, wherein each bit of the resource availability bitmap corresponds to a shared time-frequency resource.

14. The method of claim 9 further comprising:
determining if a radio resource has been allocated based on the position corresponding to the indicated position in the mobile station presence bitmap;
determining a sub-group assignment based on the SDMA bitmap; and
determining a resource assignment based on the sub-group assignment.

15. The method of claim 14, wherein the sub-group assignment is assigned as a virtual resource and further comprising receiving a bitmap that maps virtual resources to real resources.

16. A base station comprising:
a processor;
a computer readable medium storing programming for execution by the processor, the programming including instructions to:
establish a group of mobile stations for group scheduling, the group of mobile stations being divided into a plurality of sub-groups of mobile stations;
transmit a common bitmap to each sub-group of mobile stations in the group of mobile stations, the common bitmap comprising:
(a) a mobile station presence bitmap indicating that first and second mobile stations in the group of mobile stations are allocated a same time-frequency resource; and
(b) a spatial division multiple access (SDMA) bitmap indicating that the first and second mobile stations are assigned to different sub-groups.

17. The base station of claim 16, wherein the base station is a component of an orthogonal frequency division multiplexing based (OFDMA-based) wireless communication system.

18. The base station of claim 16, wherein the programming further includes instruction to establish two groups of mobile stations for group scheduling.

19. The base station of claim 16, wherein the common bitmap further comprises a resource availability bitmap that identifies resources that are available.

20. The base station of claim 19, wherein the resource availability bitmap is divided into N resource availability sub-bitmaps, wherein N is equal to the number of groups of mobile stations.

21. The base station of claim 19, wherein each bit of the resource availability bitmap corresponds to a shared time-frequency resource.

22. The base station of claim 16, wherein the mobile station presence bitmap indicates which mobile stations are allocated a radio resource, and wherein the SDMA bitmap indicates a sub-group assignment for each of the mobile stations for which a radio resource is allocated.

23. The base station of claim 22, wherein sub-group assignment is assigned as a virtual resource, which virtual resource is mapped to a real resource using a bitmap that maps virtual resources to real resources.

* * * * *